United States Patent [19]
Izumi et al.

[11] Patent Number: 5,838,405
[45] Date of Patent: Nov. 17, 1998

[54] TILED DISPLAY DEVICE

[75] Inventors: Yoshihiro Izumi, Kashihara; Tokihiko Shinomiya, Nara, both of Japan

[73] Assignee: Sharp Kabushiki Kaisha, Osaka, Japan

[21] Appl. No.: 594,033

[22] Filed: Jan. 30, 1996

[30]     Foreign Application Priority Data

Mar. 31, 1995  [JP]  Japan .................................. 7-076779

[51] Int. Cl.⁶ ................................................ G02F 1/1333
[52] U.S. Cl. ........................... 349/73; 349/122; 349/158; 156/275.7
[58] Field of Search ............................. 349/122, 74, 158, 349/73, 187; 430/20; 445/24, 25; 156/273.3, 273.5, 275.3, 275.5, 275.7

[56]              References Cited

U.S. PATENT DOCUMENTS

| | | | |
|---|---|---|---|
| 4,408,836 | 10/1983 | Kikuno ..................................... | 349/158 |
| 4,832,457 | 5/1989 | Saitoh et al. ............................. | 349/158 |
| 5,029,985 | 7/1991 | Suzuki et al. ............................ | 349/158 |
| 5,106,197 | 4/1992 | Ohuchida et al. ........................ | 349/73 |
| 5,307,190 | 4/1994 | Wakita et al. ............................ | 349/158 |
| 5,654,781 | 8/1997 | Izumi ....................................... | 349/139 |

FOREIGN PATENT DOCUMENTS

| | | |
|---|---|---|
| 5-127605 | 5/1993 | Japan . |
| 6-17178 | 5/1994 | Japan . |

*Primary Examiner*—William L. Sikes
*Assistant Examiner*—Tai V. Duong
*Attorney, Agent, or Firm*—Nixon & Vanderhye P.C.

[57]                ABSTRACT

A display device provided with a set of display panels aligned adjacently to each other placed between a large-scaled substrate and a flexible coat layer opposing each other, and the space between the display panels and the space between each display panel and the large-scaled substrate and flexible coat layer are filled with an adhesive agent. The adhesive agent bonds each display panel to another, and also the set of display panels and the large-scaled substrate and coat layer. A force acting on each display panel caused by volumetric shrinkage of the adhesive agent as it sets is absorbed by the flexible coat layer, and thus the cell gap in each display panel remains intact. As a result, a display device with a large-scaled screen of a multi-display method which can eliminate inconsistencies in color and make the connections of the display panels less noticeable can be realized.

18 Claims, 8 Drawing Sheets

TILED DISPLAY DEVICE

FIELD OF THE INVENTION

The present invention relates to a display device used for AV (audiovisual) systems or OA (office automation) systems.

BACKGROUND OF THE INVENTION

Recently, the need for a lighter, thinner, and less-power-consuming high-definition display device with a large-scaled screen has been increasing for a TV set representing the AV systems intended for home use or the OA systems. Accordingly, displays with large-scaled screens including a CRT (cathode ray tube), an LCD (liquid crystal display), a PDP (plasma display panel), an EL (electroluminescent) display, and an LED (light emitting diode) display have been steadily developed for practical use.

Of all types of displays, the liquid crystal display is most advantageous in that: (1) it has the least depth (thickness); (2) it consumes less power; and (3) it readily displays full color images. Thus, the recent application of the liquid crystal display has diversified into various fields and the expectation for a practical liquid crystal display with a large-scaled screen has been increasing.

However, upsizing the screen not only increases the manufacturing costs of the liquid crystal display, but also causes signal disconnection or defective pixels during the producing process, which raises the fraction defective of the liquid crystal display remarkably. To eliminate these problems, there has been developed a so-called liquid crystal display of a multi-display method whose screen is upsized by connecting a plurality of liquid crystal displays.

However, with the liquid crystal display of this method whose screen is formed by simply connecting the plurality of liquid crystal panels, rays from the back light leak through the spaces in the connections of the liquid crystal panels, thereby making the connections noticeable. To eliminate this problem, the Applicant of the present invention filed Japanese Patent Application No. 7-29395/1995, proposing an active matrix type liquid crystal display that can display a large realistic image by making the connections less noticeable.

Figure 8A:
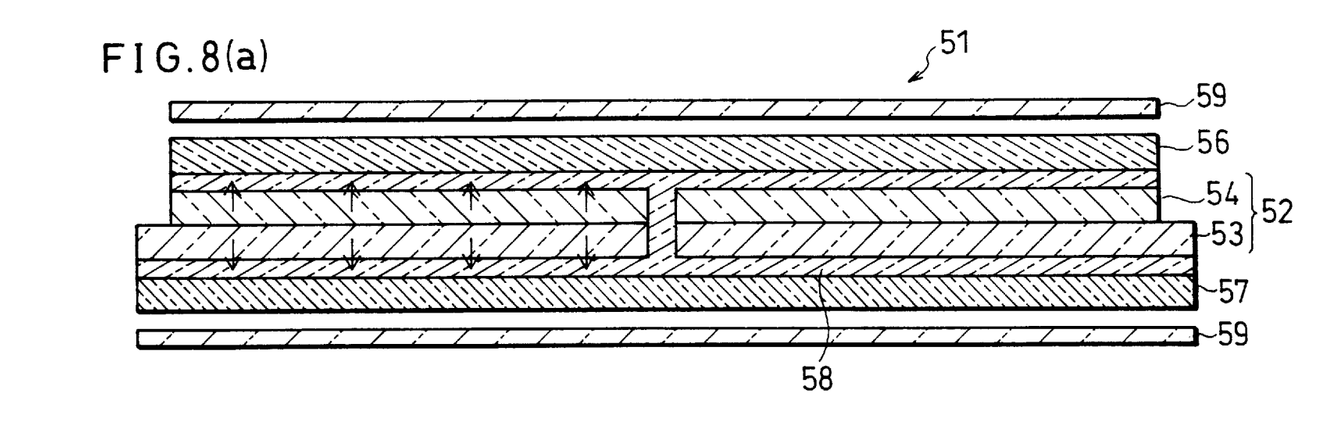
FIGS. 8(a) and 8(b) are cross sectional views schematically showing structures of conventional liquid crystal displays.
Figure 9:
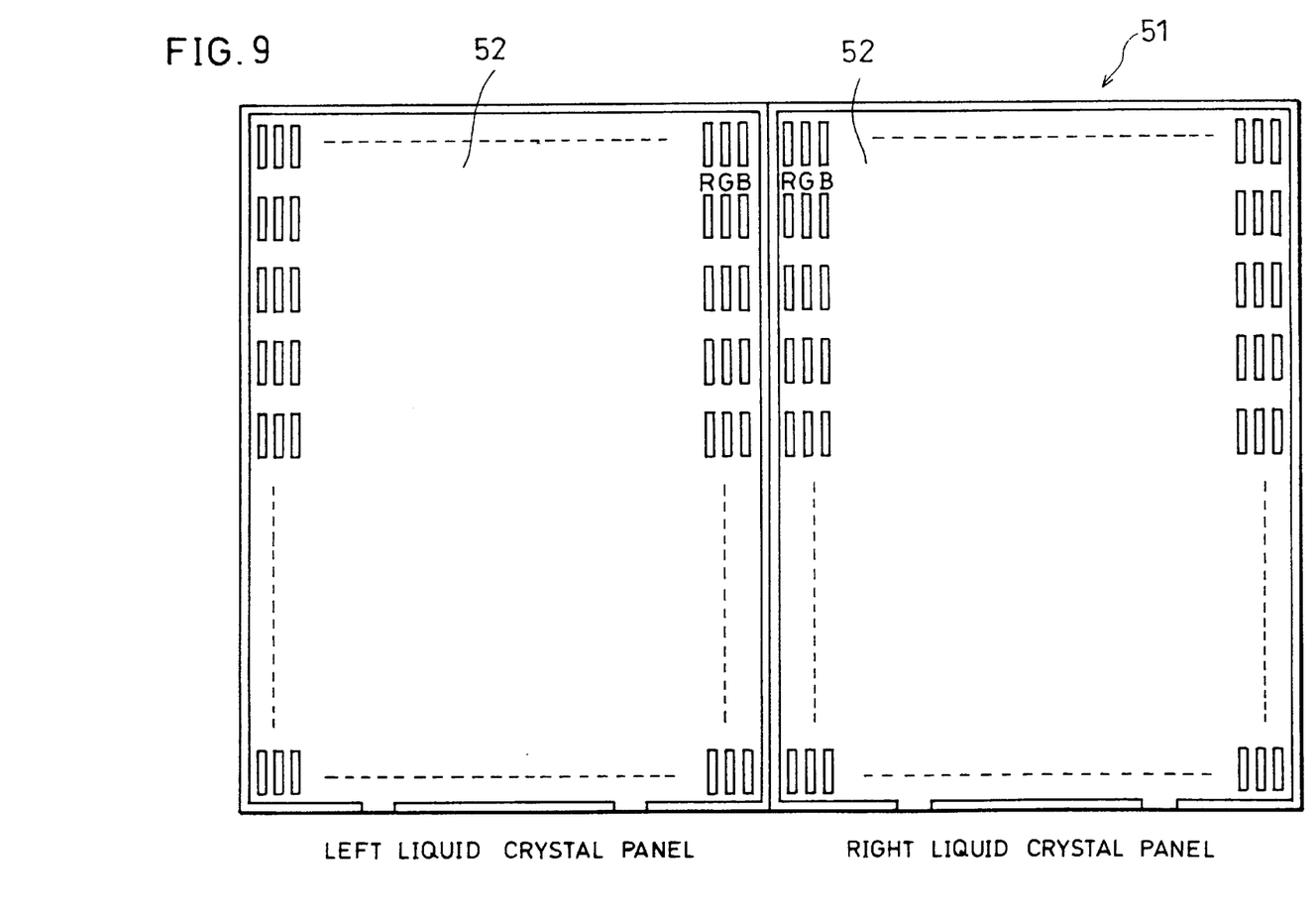
FIG. 9 is a plan view showing two connected liquid crystal panels of the above liquid crystal displays.

An example conventional liquid crystal display 51 is shown in FIG. 8(a). The liquid crystal display 51 comprises two connected liquid crystal panels 52, which are sandwiched between large-scaled substrates 56 and 57 and laminated to the same. The liquid crystal display 51 further comprises two polarizing plates 59 provided to the outer surfaces of the large-scaled substrates 56 and 57, respectively. Also, a back light, such as a cold cathode tube, is provided behind (bottom in the drawing) the liquid crystal panels 52 that altogether serve as a display panel. The back light and an image signal control driver are omitted in the drawing. One can see an image corresponding to input image data on the liquid crystal panels 52 when rays from the back light are modulated in accordance with the input image data. FIG. 9 shows a view of the two liquid crystal panels 52 connected to each other.

Each liquid crystal panel 52 is a lamination of two glass substrates with an unillustrated sealing material in between: a glass substrate 53 having TFT (thin film transistor) switching elements, pixel electrodes, etc., and a glass substrate 54 having a common electrode. The pixel electrodes are placed to oppose the common electrode and an unillustrated liquid crystal is sealed in a space therebetween. Although, it is not shown in the drawing, a non-light-transmitting pattern made of a non-light-transmitting material serving as a shadow mask is provided on each glass substrate 54 along the boundary of adjacent pixels to prevent light leakage through the adjacent pixels or color smearing.

The liquid crystal display 51 makes the connections of the liquid crystal panels 52 less noticeable by using a UV-ray-setting type adhesive agent, namely, an adhesive agent (refractive index adjustor) 58 having substantially the same refractive index as those of the glass substrates 53 and 54 and large-scaled substrates 56 and 57. More precisely, while the adhesive agent 58 is used to connect the liquid crystal panels 52 to each other, the adhesive agent 58 is also spread across on both the main surfaces of the liquid crystal panels 52 to laminate the same to the large-scaled substrates 56 and 57, respectively.

Figure 8B:
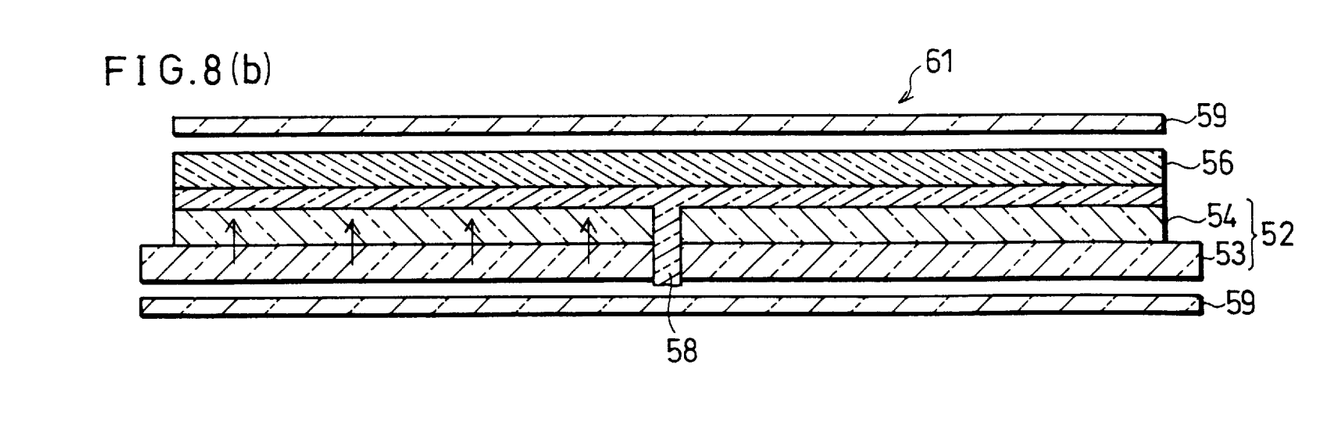

Another example conventional liquid crystal display 61 is shown in FIG. 8(b). The liquid crystal display 61 omits the large-scaled substrate 57 and the liquid crystal panels 52 are laminated to the large-scaled substrate 56 alone in the glass substrate 54 side with the adhesive agent 58.

Light is refracted as it passes through a plurality of connected liquid crystal panels when the end surface of the joints of the panel substrates has contact with a media (for example, air) having a different refractive index. In addition, light is refracted or scattered if the post-finishing end surface has irregularities. Such light refraction and scattering make the connections of the liquid crystal panels noticeable.

However, the liquid crystal displays 51 and 61 using the adhesive agent 58 can prevent such light refraction and scattering. That is to say, the refractive index is adjusted at the connections of the liquid crystal panels 52 to prevent light refraction and scattering, thereby making the connections less noticeable and hence making a resulting image more realistic.

Still, the liquid crystal display 51 has a problem as follows.

The adhesive agent 58 used as the refractive index adjustor causes volumetric shrinkage of five to ten percent when it has set, which distorts the liquid crystal panel 52. In other words, a force acts on the liquid crystal panel 52 in two directions to separate the glass substrates 53 and 54 forming the liquid crystal panel 52 as is indicated by arrows in FIG. 8(a) as the adhesive agent 58 sets, and the cell gap in each liquid crystal panel 52 is undesirably changed. As a result, a resulting display image causes inconsistencies in color.

In contrast, when the adhesive agent 58 has set and causes the shrinkage, a force acts on the liquid crystal panel 52 in the same direction with respect to the glass substrates 53 and 54 as is indicated by arrows in the liquid crystal display 61 of FIG. 8(b) omitting the large-scaled substrate 57, thereby leaving the cell gap in each liquid crystal panel 52 intact. However, omitting the large-scaled substrate 57 results in exposing the connections of the liquid crystal panels 52 and makes the same more noticeable.

To be more precise, the adhesive agent 58 serving as the refractive index adjustor is projected out from the connections of the liquid crystal panels 52 when laminating the liquid crystal panels 52 to the large-scaled substrate 56 on the same surface, and forms steps (difference in level) or irregularities. Such steps or irregularities cause light scattering as light passes through the connections and changes the polarizing states. As a result, the connections can no longer show black even under the crossed nicol state of the polarizing plates 59.

SUMMARY OF THE INVENTION

It is therefore an object of the present invention to provide a high-quality display device with a large-scaled screen made by connecting a plurality of display panels which eliminates inconsistencies in color in a resulting display image caused by undesirable variance in cell gap in each display panel and makes the connections of the display panels less noticeable.

The above object is fulfilled by a display device including:

a large-scaled substrate;

a flexible coat layer opposing the large-scaled substrate; and a set of display panels aligned adjacently to each other, the set of display panels being provided between the large-scaled substrate and the coat layer;

a space between the large-scaled substrate and the coat layer being filled with an adhesive agent, the adhesive agent connecting each display panel to another and connecting the set of display panels and the large-scaled substrate and the coat layer.

According to the above structure, the either side of the set of display panels is provided with the flexible coat layer entirely. Thus, when the adhesive agent, filled in the space between the large-scaled substrate and the coat layer, has set and causes volumetric shrinkage, a force acting on each display panel is absorbed by the flexibility of the coat layer. Accordingly, the cell gap in each display panel can remain intact and a resulting display image has no inconsistencies in color.

As a result, a display device with a large-scaled screen of a multi-display method which can eliminate inconsistencies in color in a resulting display image and make the connections of the display panels less noticeable can be realized.

A coat layer made of a polymeric film is preferred. To be more specific, it is preferable to laminate a polymeric film to either surface of the set of the display panels entirely. Accordingly, the force acting on the display panels is absorbed by a highly flexible polymeric film in a satisfactory manner, and the cell gap in each display panel can remain intact, thereby making it possible to eliminate inconsistencies in color in a resulting display image.

A polymeric film with optical isotropy is further preferred. In this case, the polymeric film does not disturb the polarizing states of display light controlled by the display panels and leaves the same in a stable manner, hence making it possible to maintain the display quality at a satisfactory level.

For example, a uniaxial oriented polyethyleneterephthalate film is preferred as the polymeric film. Because this polymeric film renders excellent strength besides optical isotropy, and therefore it can maintain the display quality at a satisfactory level while contributing to the reinforcement of the display device.

Also, a coat layer made of a glass plate of 0.7 mm or less thick is preferred. To be more specific, it is preferable to laminate a glass plate of 0.7 mm or less to either surface side of the set of the display panels entirely using an adhesive agent. Accordingly, a force acting on the display panels due to the volumetric shrinkage of the adhesive agent is absorbed by the glass plate. Thus, the cell gap in each display panel can remain intact and inconsistencies in color in a resulting display image can be eliminated.

The above object can be also fulfilled by a display device including:

a set of display panels aligned adjacently to each other;

a large-scaled substrate provided in one of two surface sides of the set of display panels; and a space between each display panel and a space between the set of display panels and the large-scaled substrate being filled with an adhesive agent, the adhesive agent connecting each display panel to another and connecting the set of display panels and the large-scaled substrate, the other surface side of the set of display panels being covered with a film made of the adhesive agent.

According to the above structure, no large-scaled substrate is provided in the other surface side of the set of the display panels. Thus, when the adhesive agent has set and causes volumetric shrinkage, the cell gap in each display panel can remain intact. In addition, neither steps nor irregularities of the adhesive agent are formed at the connections of the display panels.

As a result, a display device with a large-scaled screen of a multi-display method which can eliminate inconsistencies in color in a resulting display image and make the connections of the display panels less noticeable can be realized.

For a fuller understanding of the nature and advantages of the invention, reference should be made to the ensuing detailed description taken in conjunction with the accompanying drawings.

DESCRIPTION OF EMBODIMENTS

[First Embodiment]

Referring to FIGS. 1 through 5, the following description will describe an example embodiment of the present invention.

Figure 1:
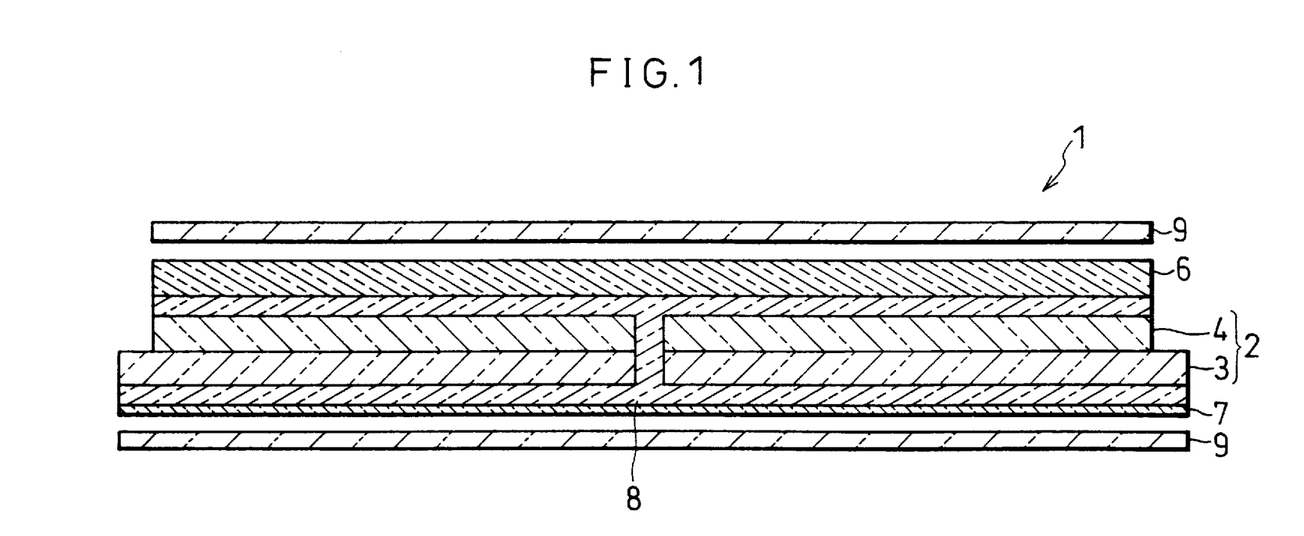
FIG. 1 is a cross sectional view schematically showing a structure of a liquid crystal display in accordance with an example embodiment of the present invention.

A display device in accordance with the present embodiment is a direct sight type liquid crystal display 1 as shown in FIG. 1. The liquid crystal display 1 comprises two connected active matrix type liquid crystal panels 2, which are sandwiched between a large-scaled substrate 6 and a polymeric film 7 and laminated to the same. Further, two polarizing plates 9 are provided to the outer surfaces of the large-scaled substrate 6 and polymeric film 7, respectively. Also, a back light, such as a cold cathode tube, is provided behind (bottom in the drawing) the liquid crystal panels 2 that altogether serve as a display panel. The back light and an image signal control driver are omitted in the drawing. Note that two liquid crystal panels 2 are connected in the present embodiment; however, the number of the liquid crystal panels 2 is not necessarily limited to two, and the screen can be upsized further by increasing the number.

Figure 2:
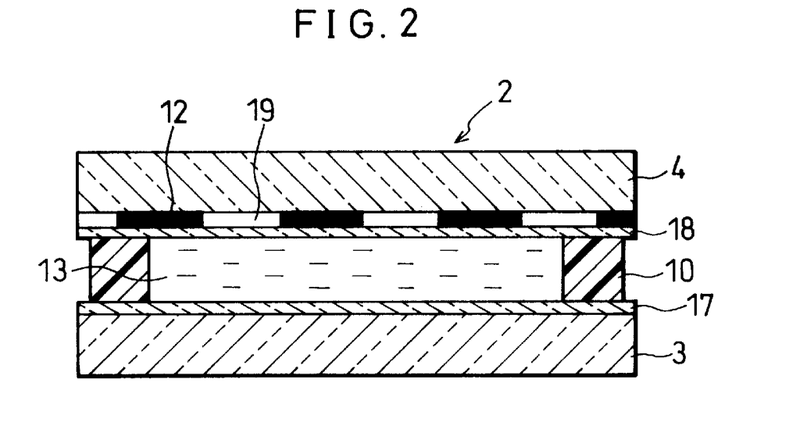
FIG. 2 is a cross sectional view showing an example structure of a liquid crystal panel provided in the above liquid crystal display.

As shown in FIG. 2, the liquid crystal panel 2 is of a liquid crystal panel structure of an active matrix type using a matrix of active elements. More precisely, glass substrates 3 and 4 are laminated to each other in parallel with a sealing agent 10 in between, and a liquid crystal 13 is sealed in the space therebetween. Pixel electrodes 17 are placed to oppose a common electrode 18, which will be described below.

Figure 3:
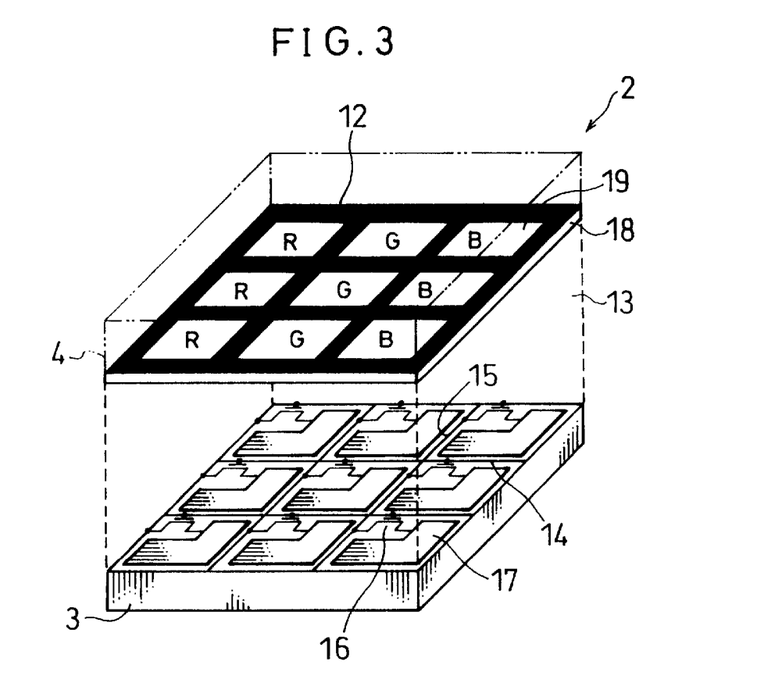
FIG. 3 is a perspective view showing the above example structure of a liquid crystal panel in the above liquid crystal display.

As shown in FIG. 3, a number of sets of a scanning electrode (gate electrode) 14, a data electrode (source electrode) 15, a TFT (thin film transistor) 16 provided around the intersection of the two electrodes 14 and 15, and a pixel electrode 17 are formed on the glass substrate 3. The TFT 16 is a transistor of an electric field effect type comprising a semiconductor film and controls the supply of an image signal to the pixel electrode 17.

On the other hand, the common electrode 18 is formed on the glass substrate 4. In case of color display, a color filter 19 is also formed together with a non-light-transmitting pattern 12. The non-light-transmitting pattern 12, also known as a black matrix, is provided to separate the color filters 19 into sets of red, green, and blue filters in such a manner that one filter corresponds to one pixel electrode 17. The non-light-transmitting pattern 12 may be formed on the glass substrate 3 instead.

Besides serving as the color filter separator, the black matrix also serves as an intercepter of incident light on portions between each pixel electrode 17 and on TFT areas. Because light passing through areas other than the pixel electrodes 17 degrades the display quality in black and thus blurs the contrast, and incident light on the TFTs 16 triggers a photo-excited leak current through the TFT channel and degrades the display quality.

The above-structured liquid crystal panels 2 are connected to each other with an adhesive agent 8, and the large-scaled substrate 6 and polymeric film 7 are laminated to the connected liquid crystal panels 2 in the glass substrate 4 side and glass substrate 3 side, respectively. Laminating the connected liquid crystal panels 2 to the large-scaled substrate 6 has following advantages:

(a) steps or flaws caused when the liquid crystal panels 2 are connected due to a difference in glass thickness or glass's warpage will not be exposed; and (b) shock resistance of the liquid crystal display 1 upsized by connecting the liquid crystal panels 2 can be improved.

Further, two polarizing plates 9 are provided to respectively cover the outer surfaces of the large-scaled substrate 6 and polymeric film 7 entirely in such a manner that their polarizing axes intersect at right angles. Thus, rays from the back light leaking through the connections of the liquid crystal panels 2 show black under the crossed nicol state of the polarizing plates 9, thereby making the connections less noticeable.

The polymeric film 7 used herein transmits UV rays and renders excellent flexibility as well as optical isotropy. Because the polymeric film 7 having optical anisotropy (birefringenece) disturbs the polarizing states of display light controlled by the liquid crystal panels 2, which results in degradation in display quality.

Thus, to prevent such degradation, a polymeric film must have a small anisotropic value (retardation:$\Delta$nd). The poly-meric film 7 of the present embodiment has the retardation of 50 nm or less and the liquid crystal display 1 exhibits satisfactory display characteristics.

Available materials for the polymeric film are: polyester, polyarylate, polyethersulfone (PES), polycarbonate (PC), and the like. Polyester (polyethyleneterephthalate (PET)) is preferable in particular for the polymeric film 7 of the present embodiment for the following reasons:

(1) it can be readily produced by polymerizing terephthalic acid or terephthalic acid dimethyl and ethylene glycol; and (2) a uniaxial oriented film of PET has excellent resistance to heat (up to 160° C.) and chemicals including strong acid and strong base chemicals and organic solvents, as well as excellent optical characteristics ($\Delta$nd$\leq$50 nm).

The adhesive agent 8 is a refractive index adjustor having substantially the same refractive index as those of the glass substrates 3 and 4, large-scaled substrate 6, and polymeric film 7. Accordingly, the refraction and scattering of light caused by the irregularities of the substrate's end surface at the connections of the liquid crystal panels 2 can be prevented. In addition, light reflection at the interface between the glass substrate 4 and large-scaled substrate 6 and the interface between the glass substrate 3 and polymeric film 7 can be prevented. Thus, a resulting display can show sharper contrast.

A transparent UV-ray-setting type adhesive agent, which is used to laminate the optical lenses and starts to set instantaneously when irradiated by UV rays, is preferred as the adhesive agent 8. Moreover, the UV-ray-setting type adhesive agent has an advantage in that the refractive index thereof can be readily adjusted to those of the glass substrates 3 and 4 and large-scaled substrate 6.

In the following, a process of producing the liquid crystal display 1 will be described, and each step of which is set forth in FIGS. 5(a) through 5(d).

Figure 5A:
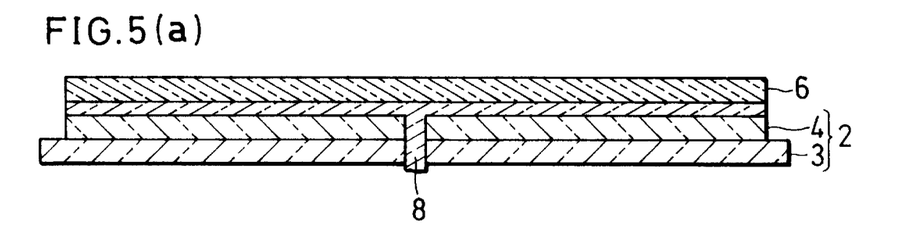
FIGS. 5(a) through 5(d) are cross sectional views showing each step in producing the above liquid crystal display.

FIG. 5(a) shows a step where two liquid crystal panels 2 are aligned adjacently on the surface of the large-scale substrate 6 in such a manner that each liquid crystal panel 2 opposes the large-scaled substrate 6 in the glass substrate 4 side. The space between the liquid crystal panels 2 and large-scaled substrate 6 must be even to prevent any step between the two liquid crystal panels 2. Plastic beads serving as spacers may be distributed on the large-scaled substrate 6 to this effect. Then, the UV-ray-setting type adhesive agent 8 is filled in the space between the large-scaled substrate 6 and each liquid crystal panel 2 and the space between the two liquid crystal panels 2.

Figure 5B:
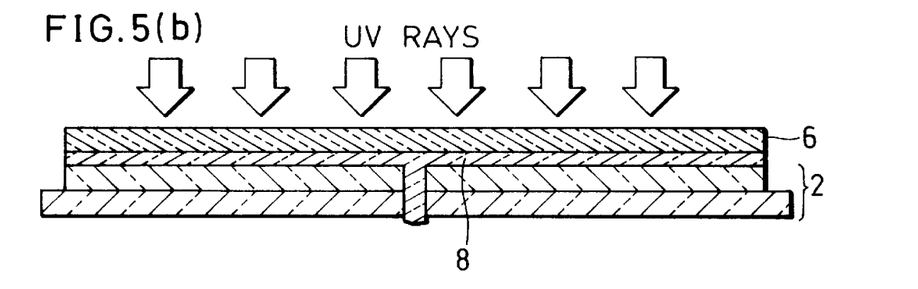

FIG. 5(b) shows a step where, after setting the position of each liquid crystal panel 2, UV rays are irradiated on the adhesive agent 8 entirely from the large-scaled substrate 6 side as is indicated by arrows to set the adhesive agent 8.

Figure 5C:
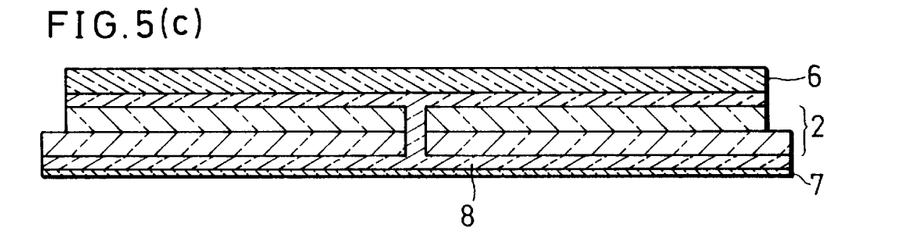

FIG. 5(c) shows a step where the polymeric film 7 is placed so as to oppose the liquid crystal panels 2 in the glass substrate 3 side and the adhesive agent 8 is filled into the space between the polymeric film 7 and each liquid crystal panel 2. The polymeric film 7 used herein transmits UV rays and renders excellent flexibility as well as optical isotropy.

Figure 5D:
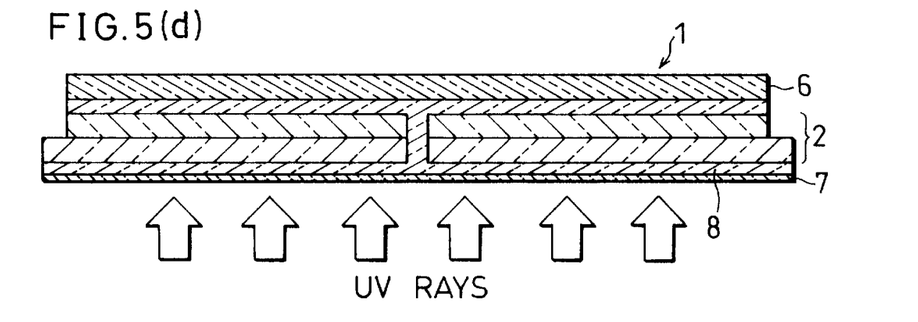

FIG. 5(d) shows a step where UV rays are irradiated on the adhesive agent 8 entirely from the polymeric film 7 side as is indicated by arrows to set the adhesive agent 8. The adhesive agent 8 has substantially the same refractive index as those of the glass substrates 3 and 4, large-scaled substrate 6, and polymeric film 7. The adhesive agent 8 of the present embodiment has the refractive index of 1.54. (The polarizing plates 9, driver, and back light are provided in the conventional manner.)

The pre-set UV-ray-setting adhesive agent 8 used herein has fluidity and starts to set when irradiated by an adequate amount of UV rays. When the adhesive agent 8 has set, it causes volumetric shrinkage of five to ten percent. However, the flexible polymeric film 7 absorbs the shrinkage caused as the adhesive agent 8 sets and eliminates distortion of the cell gap in each liquid crystal panel 2. Thus, the cell gap remains intact and a resulting display image causes no inconsistencies in color.

Moreover, the optical isotropy of the polymeric film 7 prevents the disturbance of the polarizing state of light from the back light.

Therefore, the above structure makes it possible to provide a high-grade liquid crystal display with a large-scaled screen of multi-display method that causes no inconsistencies in color in a resulting display and makes the connections of the liquid crystal panels 2 less noticeable.

In the present embodiment, the polymeric film 7 prevents variance in cell gap in each liquid crystal panel 2 caused by the adhesive agent 8. However, the irregularities may be prevented by another method. For example, like a liquid crystal display 31 shown in FIG. 4, the polymeric film 7 may be replaced with a thin glass plate 11, which is laminated to the liquid crystal panels 2 in the glass substrate side 3 using the adhesive agent 8 in the same manner as the polymeric film 7.

Figure 4:
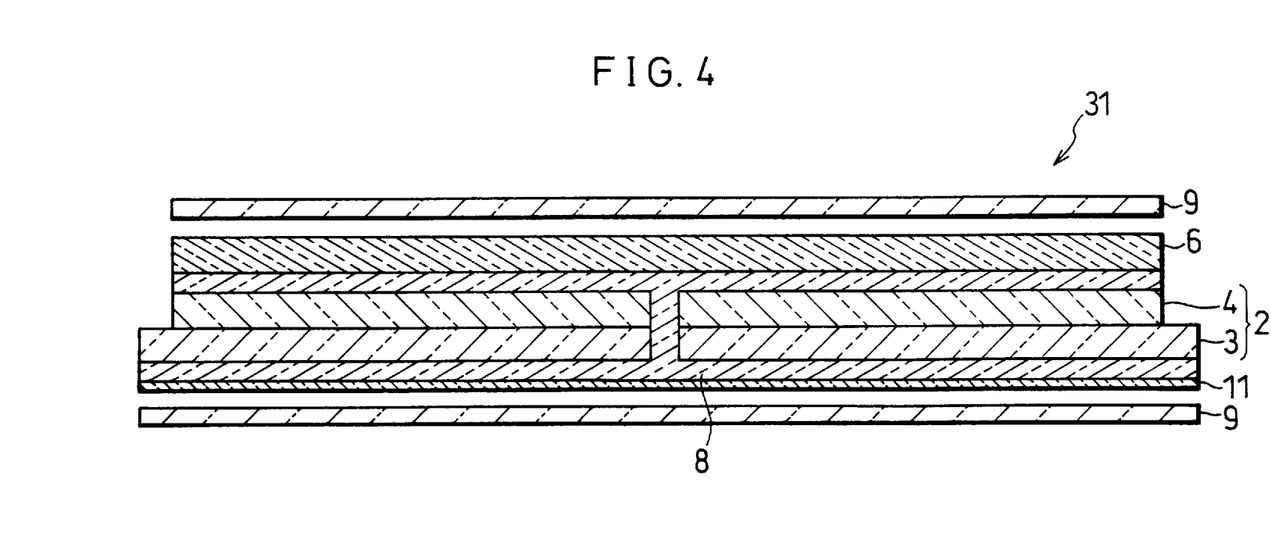
FIG. 4 is a cross sectional view schematically showing another structure of a liquid crystal display in accordance with the above example embodiment of the present invention.

The thin glass plate 11 used herein has a thickness of 0.7 mm or less and renders excellent flexibility. Therefore, the glass plate 11 can also absorb the shrinkage of the adhesive agent 8 as the adhesive agent 8 sets and prevents the variance in cell gap in each liquid crystal panel 2.

[Second Embodiment]

Figure 6:
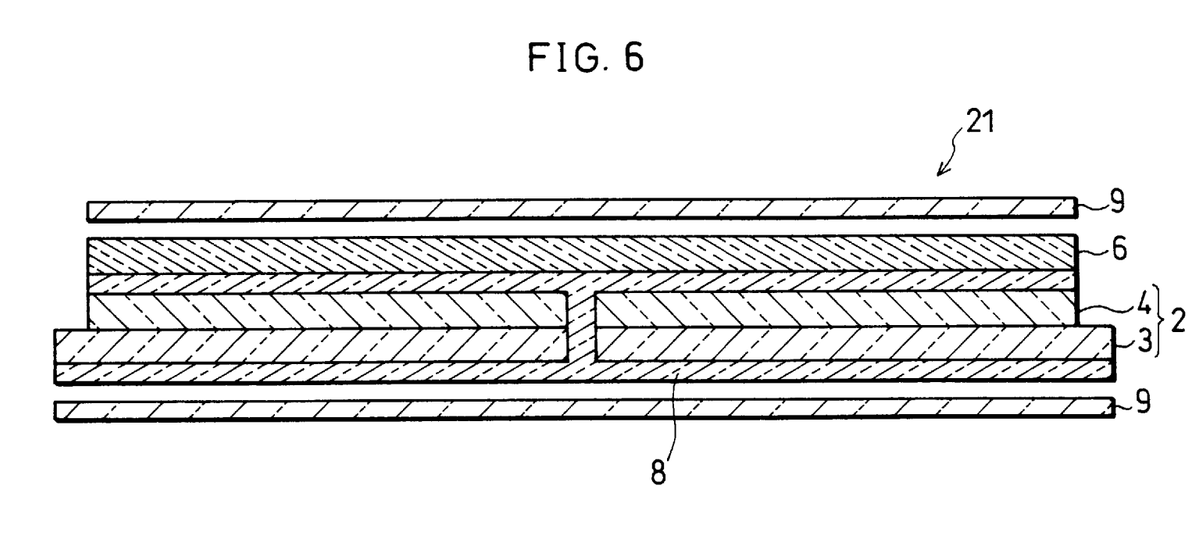
FIG. 6 is a cross sectional view schematically showing a structure of a liquid crystal display in accordance with another example embodiment of the present invention.

Referring to FIGS. 6 and 7, the following description will describe another example embodiment of the present invention. Hereinafter, like components are labeled with like reference numerals with respect to the first embodiment, and the description of these components is not repeated for the explanation's convenience.

As shown in FIG. 6, a liquid crystal display 21 of the present embodiment is of the same structure as the counterpart of the first embodiment except that it includes neither the polymeric film 7 nor thin glass plate 11. In other words, the present embodiment is characterized in that it realizes the same effect as the first embodiment using a film of the set adhesive agent 8 alone. The back light and image signal control driver are omitted in the drawing. Note that two liquid crystal panels 2 are connected in the present embodiment; however, the number of the liquid crystal panels 2 is not necessarily limited to two, and the screen can be upsized further by increasing the number.

In the following, a process of producing the liquid crystal display 21 will be described, and each step of which is set forth in FIGS. 7(a) through 7(e).

Figure 7A:
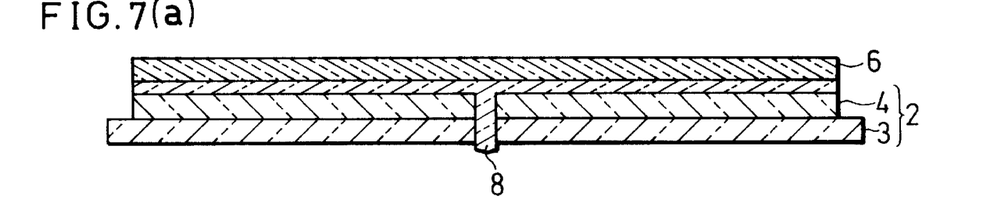
FIGS. 7(a) through 7(e) are cross sectional views showing each step in producing the liquid crystal display of FIG. 6.
Figure 7B:
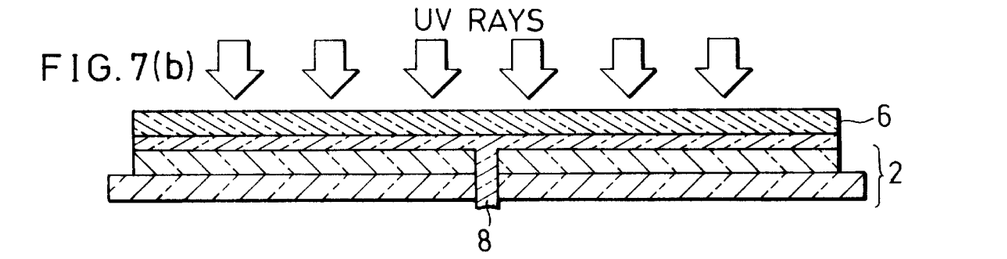

FIGS. 7(a) and 7(b) show steps where two liquid crystal panels 2 are placed adjacently on the surface of the large-scaled substrate 6, and the UV-ray-setting type adhesive agent 8 is filled into the space between the large-scaled substrate 6 and each liquid crystal panel 2 and the space between the two liquid crystal panels 2 to be set in the same manner as the liquid crystal display 1 of the first embodiment shown in FIGS. 5(a) and 5(b).

Figure 7C:
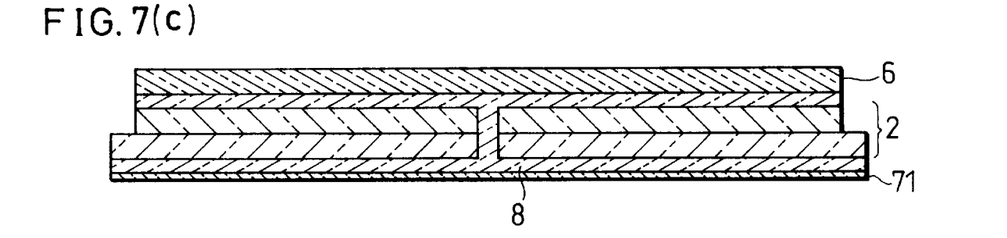

FIG. 7(c) shows a step where a film 71 is placed to oppose each liquid crystal panel 2 in the glass substrate 3 side, and the UV-ray-setting type adhesive agent 8 is filled in the space between the film 71 and each liquid crystal panel 2. The film 71 used herein transmits UV rays and has flexibility.

Figure 7D:
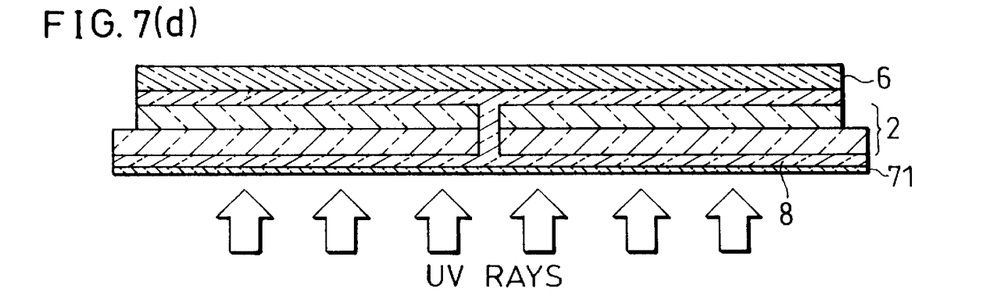

FIG. 7(d) shows a step where UV rays are irradiated on the adhesive agent 8 entirely from the film 71 side (in a direction indicated by arrows) to set the same.

Figure 7E:
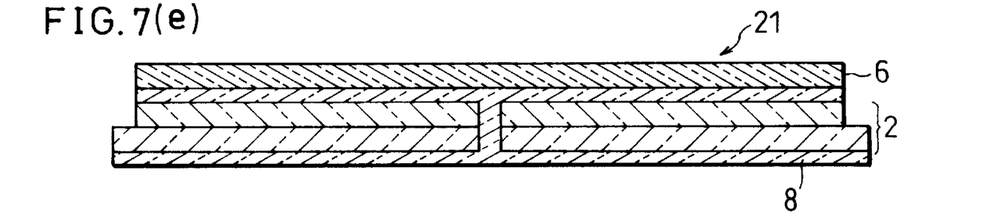

FIG. 7(e) shows a step where the film 71 is removed and a film of the set adhesive agent 8 is exposed entirely. (The polarizing plates 9, driver, and back light are provided in the conventional manner). The film 71 is removed easily if silicon or a fluorine-based removing agent is applied to the bonding surfaces of the film 71 to the adhesive agent 8 in advance.

The liquid crystal display 21 is assembled through the above process. The flexible film 71 formed as above absorbs the shrinkage of the adhesive agent 8 when it has set, and eliminates the distortion of the cell gap in each liquid crystal panel 2. Besides, the film 71 is removed later and has no adverse effect on display light. As a result, a high-grade liquid crystal display with a large-scaled screen of multi-display method can be provided like the first embodiment.

In addition, since the film 71 is removed after the adhesive agent 8 has set, the optical isotropy is not a must. Therefore, the film 71 can be made out of materials in a wide range. Moreover, the film 71 is economical because it can be used repetitively.

Although the UV-ray-setting type adhesive agent is used as the adhesive agent 8 in the first and second embodiments, an adhesive agent of a thermo-setting type or chemical-setting type is also applicable, provided that it satisfies the conditions as to refractive index, transmittance, bonding strength, etc.

In the first and second embodiments, the multi-panel method screen of each of the liquid crystal displays 1, 31, and 21 is upsized by connecting the liquid crystal panels 2 of an active-matrix driven type. However, the liquid crystal panels of a duty driven type may be used as well.

Further, in the first and second embodiments, the liquid crystal panels 2 are connected in the multi-panel method screen for the display device. However, plasma display panels (PDP) or EL (elecroluminescent) displays may be connected to each other instead. Note that, however, connecting the liquid crystal panels 2 is most effective in terms of eliminating the variance in cell gap.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A display device including:
   a large-scaled substrate;
   a flexible coat layer opposing said large-scaled substrate; and
   a set of display panels aligned adjacently to each other, said set of display panels being provided between said large-scaled substrate and said coat layer;
   a space between said large-scaled substrate and said coat layer being filled with an adhesive agent, said adhesive agent connecting each display panel to another and connecting said set of display panels and said large-scaled substrate and said coat layer.

2. The display device as defined in claim 1, wherein said coat layer is made of a polymeric film.

3. The display device as defined in claim 2, wherein said polymeric film renders optical isotropy.

4. The display device as defined in claim 3, wherein said polymeric film is a uniaxial oriented polyethyleneterephthalate film.

5. The display device as defined in claim 1, wherein said coat layer is made of a glass plate of 0.7 mm or less thick.

6. The display device as defined in claim 1, wherein said adhesive agent is made of a material having a substantially same refractive index as refractive indexes of said large-scaled substrate, a substrate of each display panel, and said coat layer.

7. The display device as defined in claim 1, wherein said large-scaled substrate, said set of display panels, and said coat layer are sandwiched by two polarizing plates, said two polarizing plates being placed in such a manner that their polarizing axes intersect at right angles.

8. The display device as defined in claim 1, wherein said adhesive agent is a UV-ray-setting type adhesive agent and said coat layer transmits UV rays.

9. The display device as defined in claim 1, wherein each display panel is a liquid crystal panel.

10. The display device as defined in claim 9, wherein each liquid crystal panel includes a pair of substrates,
    (1) one of said pair of substrates being provided with:
        (i) a matrix of a plurality of pixel electrodes;
        (ii) a plurality of data electrodes and a plurality of scanning electrodes for supplying image signals respectively to said plurality of pixel electrodes; and
        (iii) a plurality of active elements, respectively connected to said plurality of pixel electrodes, for controlling supply of the image signal to each pixel electrode;
    (2) the other substrate being provided with:
        (iv) a non-light-transmitting pattern for blocking incident light on a space between each pixel electrode and on said plurality of active elements;
        (v) a color filter including a set of red, green, and blue filters in a specific pattern, one filter corresponding to one pixel electrode; and
        (vi) a common electrode for, together with said plurality of pixel electrodes, applying a voltage to a liquid crystal.

11. A producing process of a display device including a large-scaled substrate, a flexible coat layer opposing said large-scaled substrate, and a set of display panels aligned adjacently to each other, said set of display panels being provided between said large-scaled substrate and said coat layer, a space between said large-scaled substrate and said coat layer being filled with an adhesive agent, said adhesive agent connecting each display panel to another and connecting the display panels and said large-scaled substrate and said coat layer, said producing process comprising:
    a first step of aligning said set of display panels adjacently on a plane surface of said large-scaled substrate and filling said adhesive agent of a UV-ray-setting type in a space between each display panel and a space between said set of display panels and said large-scaled substrate;
    a second step of setting said adhesive agent by irradiating UV rays on said adhesive agent entirely from a large-scaled substrate side;
    a third step of providing said coat layer capable of transmitting UV rays on a side surface of each display panel, said side surface opposing a surface where said large-scaled substrate is placed, and filling said UV-setting type adhesive agent in a space between said set of display panels and said coat layer; and
    a fourth step of setting said adhesive agent by irradiating UV rays onto said adhesive agent entirely from a coat layer side.

12. A display device including:
    a set of display panels aligned adjacently to each other;
    a large-scaled substrate provided on only one of two surface sides of said set of display panels; and
    a space between each display panel and a space between said set of display panels and said large-scaled substrate being filled with an adhesive agent, said adhesive agent connecting each display panel to another and connecting said set of display panels and said large-scaled substrate,
    the other surface side of said set of display panels being covered with a film made of said adhesive agent.

13. The display device as defined in claim 12, wherein said adhesive agent is made of a material having a substantially same refractive index as refractive indexes of said large-scaled substrate and a substrate of each display panel.

14. The display device as defined in claim 12, wherein said large-scaled substrate and said set of display panels are sandwiched by two polarizing plates, said two polarizing plates being placed in such a manner that their polarizing axes intersect at right angles.

15. The display device as defined in claim 12, wherein said adhesive agent is a UV-ray-setting type adhesive agent.

16. The display device as defined in claim 12, wherein each display panel is a liquid crystal panel.

17. The display device as defined in claim 16, wherein each liquid crystal panel includes a pair of substrates,
    (1) one of said pair of substrates being provided with:
        (i) a matrix of a plurality of pixel electrodes;
        (ii) a plurality of data electrodes and a plurality of scanning electrodes for supplying image signals respectively to said plurality of pixel electrodes; and
        (iii) a plurality of active elements, respectively connected to said plurality of pixel electrodes, for controlling supply of the image signal to each pixel electrode;
    (2) the other substrate being provided with:
        (iv) a non-light-transmitting pattern for blocking incident light on a space between each pixel electrode and on said plurality of active elements;
        (v) a color filter including a set of red, green, and blue filters in a specific pattern, one filter corresponding to one pixel electrode; and
        (vi) a common electrode for, together with said plurality of pixel electrodes, applying a voltage to liquid crystals.

18. A producing process of a display device including a set of display panels aligned adjacently to each other, and a large-scaled substrate provided in one of two surface sides of said set of display panels, a space between each display panel and a space between said set of display panels and said large-scaled substrate being filled with an adhesive agent, said adhesive agent connecting each display panel to another and connecting said set of display panels and said large-scaled substrate, the other surface side of said set of display panels being covered with a film made of said adhesive agent, said producing process comprising:
    a first step of aligning said set of display panels adjacently on a plane surface of said large-scaled substrate and filling said adhesive agent of a UV-ray-setting type in a space between each display panel and a space between said set of display panels and said large-scaled substrate;

a second step of setting said adhesive agent by irradiating UV rays on said adhesive agent entirely from a large-scaled substrate side;

a third step of placing a flexible coat layer capable of transmitting UV rays on the other surface side of said set of display panels and filling said adhesive agent of the UV-ray-setting type in a space between said set of display panels and said coat layer;

a fourth step of setting said adhesive agent by irradiating UV rays onto said adhesive agent entirely from a coat layer side; and a fifth step of removing said coat layer.

* * * * *